United States Patent [19]

Lucas et al.

[11] 4,167,739
[45] Sep. 11, 1979

[54] INSTRUMENT LANDING SYSTEM GLIDEPATH ANTENNA ARRAY AND DRIVE THEREFOR

[75] Inventors: James G. Lucas, Wahroonga; Alan C. Young, West Pennant Hills, both of Australia

[73] Assignee: University of Sydney, Sydney, Australia

[21] Appl. No.: 848,692

[22] Filed: Nov. 4, 1977

[30] Foreign Application Priority Data

Nov. 12, 1976 [AU] Australia .............................. PC8120

[51] Int. Cl.² .......................... H01Q 3/26; G01S 1/08
[52] U.S. Cl. ....................................... 343/854; 343/107
[58] Field of Search .................... 343/853, 854, 108 R, 343/107, 816, 846

[56] References Cited

FOREIGN PATENT DOCUMENTS 1053232 12/1966 United Kingdom ...................... 343/853

Primary Examiner—Eli Lieberman
Attorney, Agent, or Firm—Ladas, Parry, Von Gehr, Goldsmith & Deschamps

[57] ABSTRACT

An instrument landing system (ILS) glidepath antenna array and drive therefor which provides for lower susceptibility to above-ground interference and higher stability than the known M-array system. The antenna array also provides for a shorter image ground requirement than the known null reference and sideband reference systems. The antenna array comprises a four-element structure, two of which are driven with CBS only signals having relatively different amplitude and phase, and the other two elements of which are driven with SBO only signals having relatively different amplitude and phase.

2 Claims, 7 Drawing Figures d = INTERELEMENT SPACING
$A_n$ = ANTENNA DRIVE CURRENT
$\theta$ = ANGLE TO RECEIVER
R = DISTANCE TO RECEIVER FROM THE LOWEST ANTENNA
$r_n$ = DISTANCE TO RECEIVER FROM THE nth ELEMENT

INSTRUMENT LANDING SYSTEM GLIDEPATH ANTENNA ARRAY AND DRIVE THEREFOR

FIELD OF THE INVENTION

This invention relates to an instrument landing system (ILS) glidepath antenna array and drive therefor, the invention being applicable particularly to a system for siting in locations having above-ground obstacles ahead of the array aperture.

PRIOR ART

Instrument landing systems developed prior to and since the year 1946, when the ILS international standard was adopted, may be categorized as falling within one of three groups; the null reference system, the sideband reference system or the M-Array system.

The simplest of the ILS systems is the null reference system. This uses an array having two vertically disposed antenna elements, with the lower antenna element being located at one-half the height above ground of the upper antenna element. A reference signal equally modulated by phase locked 90 Hz and 150 Hz tones (CSB) is fed to the lower antenna element producing a lobed pattern with its first maximum above the ground at 3° and the first null at 6°. The upper antenna element radiates only 90 Hz and 150 Hz sideband energy (SBO) producing a lobed pattern with a first maximum above ground at 1.5° and the first null at 3°. This first sideband null at 3° establishes the angle of the glidepath and the path width is formed within the region of the null. The signals are phased such that the sideband signals radiated by the upper antenna element and the lower antenna element reference signal add below the null to give predominantly fly-up sidebands (150>90) and above the null to give predominantly fly-down sidebands (90>150). The path is formed in a region of high signal strength and the receiver simply separates and compares audio tones.

The null reference system typically has a flat and level image ground requirement of 800 meters, for a 3° glidepath, and, because the sideband pattern rises approximately linearly from 0°, the system is very susceptible to aboveground interference.

Glidepath sites are rarely ideal and antenna arrays must frequently operate with short ground planes or above-ground obstacles in the forward region. Either of these unfavourable conditions can severely degrade the performance of the null reference system and, to cope with such problem sites, the side band reference and the M-array systems were proposed.

The sideband reference system has been one of the most commonly used glidepath systems since 1960 and it employs two driven antenna elements, one located above the other. The upper element is driven with a SBO signal and the lower element is driven with both CSB and SBO signals. The SBO signal to the lower element is 180° phase displaced with respect to the SBO signal driving the upper element. This, sideband reference, system is just as susceptible to above-ground interference as the null reference system, but it has the merit of requiring an image plane of only 700 meters, for a 3° glidepath angle.

The M-array system has also been widely used since 1960 and is often referred to as the Capture Effect array when used with clearance signals. The system uses a three-element array with the upper, lower and middle elements being driven with SBO signals, and the middle and lower elements being driven also with CSB signals. The upper and lower element SBO driving signals have amplitude and phase $1\angle 0°$, whilst the middle element SBO signal has amplitude and phase $2\angle 180°$. The middle element CSB drive signal has amplitude and phase $1\angle 0°$ and the lower element CSB signal has amplitude and phase $2\angle 180°$.

The M-array system has an image ground requirement of 550 meters, i.e. significantly less than the null reference system, and, under ideal conditions, the system has low susceptibility to above-ground interference. Thus, the M-array field has a characteristic "scooped-out" pattern above 0° along the extended centreline of a runway and any above-ground obstacles along the extended centerline will not significantly affect the system performance. But the presence of obstacles in other regions displaced laterally from the centreline may cause interference, as may in-line objects if the array is defocussed.

Although the sideband reference and M-array systems respectively have advantages over the null reference system in terms of image ground requirements and above-ground interference susceptibility, they are not so stable as the null reference system, in which a 10% drive error causes a change only in the path width. In the case of the sideband reference system a 10% error may cause a shift in the glidepath angle by plus or minue one-third degree, and in the case of the M-array system a 10% drive error varies the glidepath angle by plus or minus one-quarter degree. However, of greater concern in the case of the M-array system is that a false glidepath at angles up to 1.18° to the ground may be created and the amplitude and phase of drives to the array must therefore be closely monitored.

The sideband reference and the M-array systems were developed by the trial and error method of adding sinewave space patterns.

DEVELOPMENT OF THE INVENTION

The inventors have now taken an analytical approach to the design of ILS antenna arrays to suit various siting requirments and have developed the work of Schelkunoff (referred to hereinafter) to produce a family of array designs which are related by a common mathematical treatment.

SUMMARY OF THE INVENTION

The present invention is directed to a novel antenna array, and drive therefor, which constitutes one of the family of designs referred to above and which provides for low susceptibility to above-ground interference similar to the M-array system. The antenna array of the present invention also provides for greater stability in operation than the M-array system.

Thus, the present invention provides an instrument landing system (ILS) antenna array comprising four substantially equi-spaced elements arrayed one above another above a ground plane, the lowermost element and the centre one of the upper three elements being arranged to be driven to radiate CSB energy alone, and the uppermost element and the centre one of the lower three elements being arranged to be driven to radiate SBO energy alone.

The successive elements are preferably spaced apart by the same distance as the lowermost element is spaced from the ground.

The (relative) amplitude and phase of the driving signal to the respective elements is given by:

lowermost element CSB = $3\angle 180°$
centre one of upper elements CSB = $1\angle 0°$
uppermost element SBO = $1\angle 0°$
centre one of lower three elements SBO = $2\angle 180°$ The drive magnitudes as above quoted may vary as between one another by 15% and the respective phase angles may vary by plus or minus 10°.

Each element above specified may comprise a single dipole mounted within a corner reflector to achieve a desired directivity. However, it is to be understood that each element as such may be constituted by an array of elements (e.g. a Yagi array) for the purpose of obtaining directivity.

The present invention will be more fully understood from the following description of its development and a preferred embodiment thereof, the description being given with reference to the accompanying drawings.

IN THE DRAWINGS

FIG. 1 is a diagram of a Schelkunoff linear array,

FIG. 2 is a circle diagram in the complex plane described by a variable in the field angular variation expression derived y Schelkunoff, FIG. 3 is a diagram of a linear array which is extended to include an image array, FIGS. 4a and 4b shown SBO and CSB excitation of elements of an array in accordance with a preferred embodiment of the invention, FIG. 5 shows a characteristic field pattern produced by an array when excited as shown in FIGS. 4a and 4b, and FIG. 6 shows the array in accordance with the preferred embodiment, including the SBO and CSB drive signals, and a drive system scheme for the array.

DETAILED DESCRIPTION OF THE INVENTION

Figure 1:
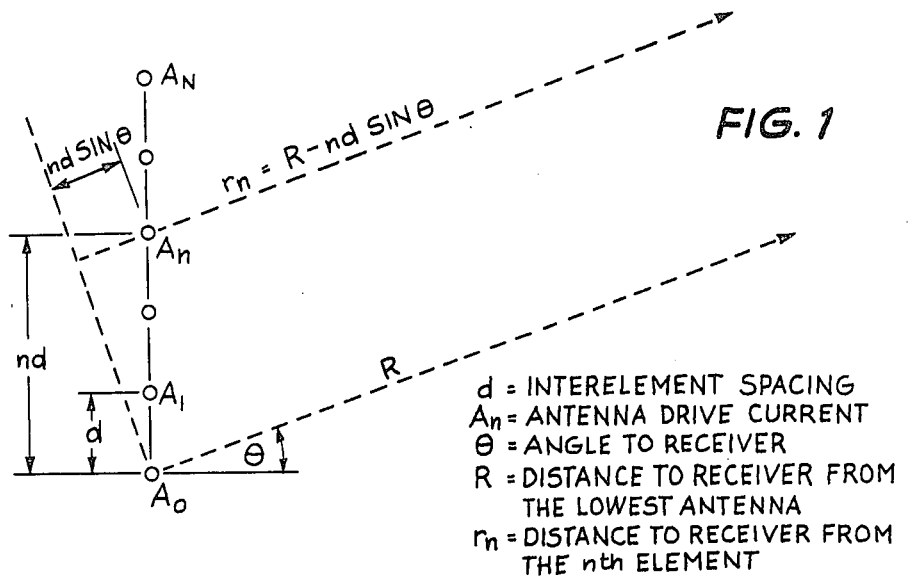

In respect of the simple array shown in FIG. 1, S. A. Schelkunoff developed a theory ("A mathematical theory of linear arrays", BSTJ 22,1, pages 80–107, (1943)) for the analysis of linear equi-spaced arrays which is based on a simple circle diagram. The angular variation of the field of the array of FIG. 1 can be shown to be completely described by the expression $$\text{Field} \propto F(Z) = \sum_{n=0}^{N} A_n Z^n$$

where
$A_n$ are the antenna drives,
and $Z = e^{j\Psi}$,
and $\Psi = (2\pi/\lambda \cdot d) \sin f$ This polynomial in Z has roots (zeros) and can be factorized into N factors given as $$F(Z) = (Z - Z_1)(Z - Z_2)(Z - Z_3) \ldots (Z - Z_n)$$

wherein $Z_n$ are the N zeros of F(Z).

Figure 2:
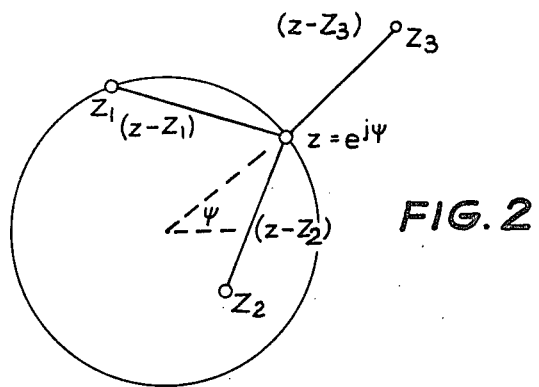

The variable $Z = e^{j\Psi}$ described a unit circle in the complex plane, shown in FIG. 2, and the field pattern is developed by moving around this unit circle taking the product of all the distances $(Z - Z_n)$ from this general point Z to all the zeros. This allows the field pattern to be easily visualized. For the angles used in glidepath analysis $\psi$ is proportional to the angle of elevation $\theta$.

Figure 3:
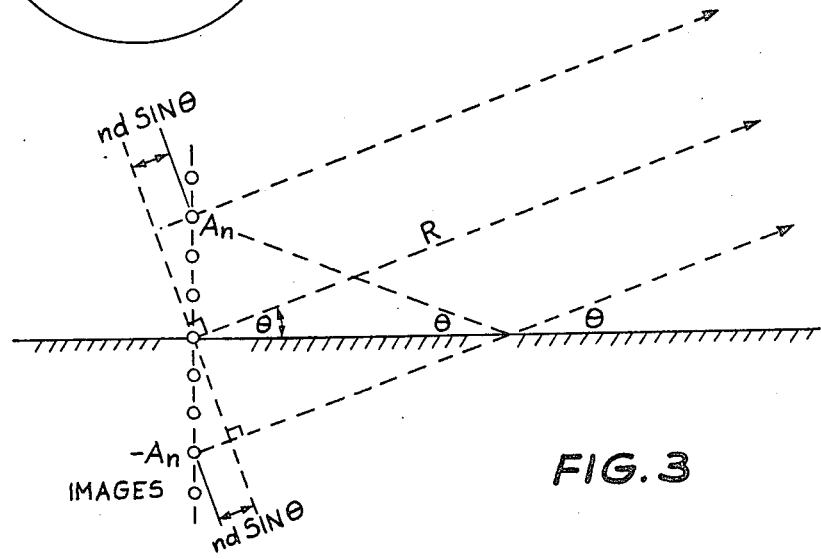

The inventors have extended the abovementioned Schelkunoff theory to cover horizontally polarized image arrays as shown in FIG. 3. This is considered as having a dummy zero element in the ground plane and negative image elements, in addition to the above-ground driven elements. The field from the driven elements has a phase lead whilst that from the image elements has an identical phase lag and Z becomes $Z^{-1}$. It then follows that the field from the array of images must be added to that from the driven (above-ground) array to give the array polynomial and since $A_o$ (the dummy ground element) is zero then $$F(Z) = \sum_{n=1}^{N} (A_n Z^n + (-A_n) Z^{-n}).$$

Since this can be expressed as
$$F(Z) = (A_N Z^{2N} + A_{N-1} Z^{2N-1} \ldots A_{N-1} Z - A_N),$$

the image polynomial always has 2N zeros.

A factor of $(Z - Z^{-1})$ is always present in an image array polynomial and since $(Z - Z^{-1}) = (1/Z)(Z-1)(Z-1)$ a pair of zeros always occurs on the unit circle at $Z = +1$ and at $Z = -1$. The zero at $Z = +1$ means that F(Z) is zero on the horizon, as expected. The denominator always has a magnitude of unity and does not effect the magnitude of F(Z).

All other zeros occur as pairs of inverses at $Z_n$ and at $1/Z_n$, this contributing a pair of factors of the form $$1/Z(Z - Z_n)(Z - Z(1/Z_n)) = (Z + P_n + Z^{-1})$$

wherein $P_n = -(Z_n + (1/Z_n))$.

Since there are N such factors the image polynomial becomes $$F(Z) = (Z - Z^{-1})(Z + P_2 + Z^{-1})(Z + P_3 + Z^{-1}) \ldots (Z + P_n + Z^{-1})$$

Figure 4A:
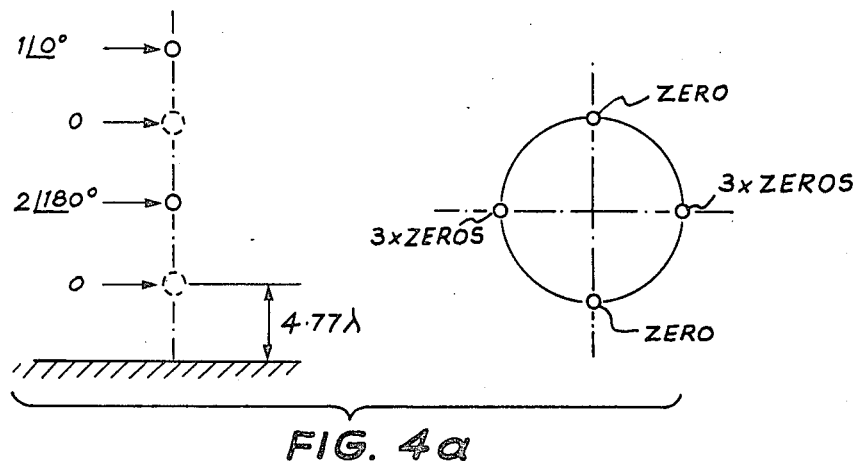
Figure 4B:
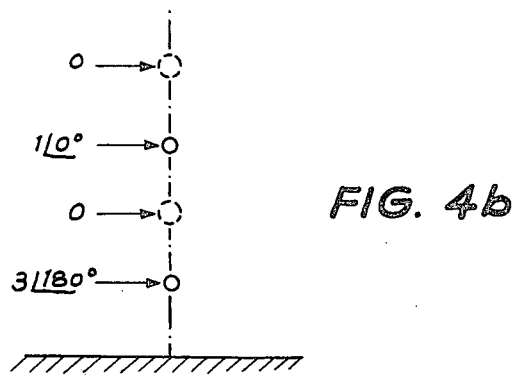

This is the fundamental glide path design equation developed by the inventors and from which the array and drives of the present invention are generated. This array is shown in FIGS. 4a and 4b. FIG. 4a shows the (relative) SBO drive magnitude and phase, and shows also the (SBO) zero positions on the corresponding circle diagram. It is to be noted that there are three zeros at both the $Z = +1$ and $Z = -1$ points, and one zero at both the $Z = +j1$ and $Z = -j1$ points. FIG. 4b shows the (relative) CSB drive magnitude and phase.

Figure 5:
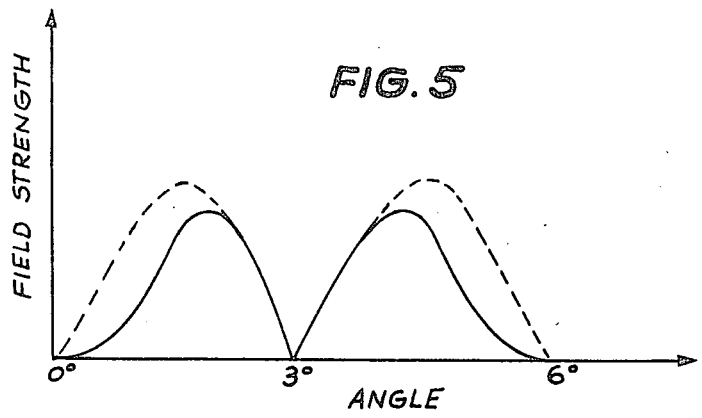

The drive arrangement for this array results in a characteristic "scooped-out" field pattern (similar to that of an M-array system) as shown in FIG. 5. The scooping occurs between 0° and 1.5°, and is contrasted with the unscooped pattern of the null reference system as shown in dotted outline. However, it has been found that the array of the present invention is superior to the M-array system in that defocusing does not affect the path angle over the final approach (near field) range because each element has a natural null on path. Thus, the array does not need to be focussed along a runway centerline, so that it is possible to arrange focussing in the general forward direction and obtain the ideal infinite scooped field at one dominant object.

The array of the present invention has also been found to be very much more stable than the M-array. Thus, the path angle is independent of drives and the drive error needed to produce a false path is four times greater than that needed for the M-array system.

Figure 6:
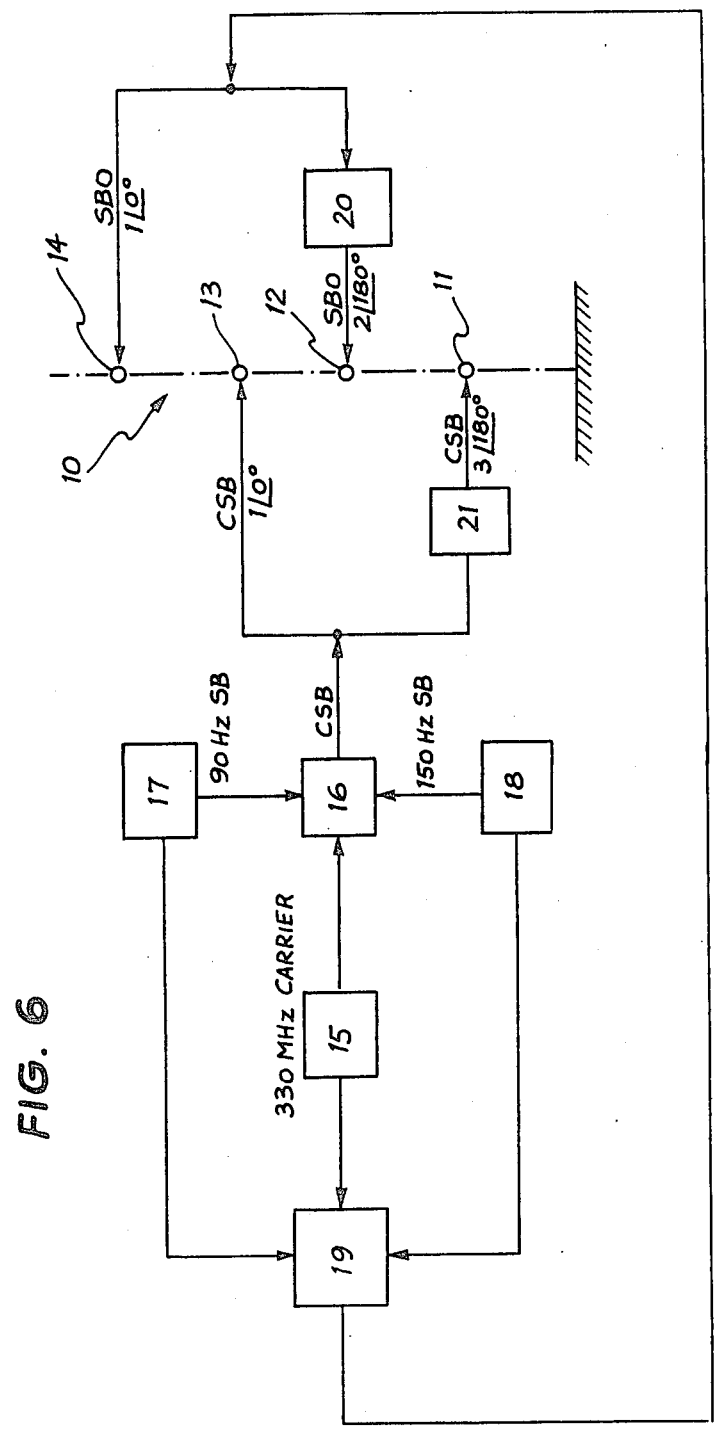

Reference is now made to FIG. 6 of the drawings which shows a complete array 10 having the four elements and excitation shown in FIGS. 4a and 4b. Although not so shown, each element 11 to 14 preferably comprises a single dipole mounted within a corner reflector, and the dipoles are equi-spaced. For a 3° glide-path, the array is 17.4 meters high and has a ground clearance for the lowermost element 11 of 4.34 meters.

A reference signal generator 15 provides a carrier frequency of 330 MHz which is fed to a mixer 16, which receives also 90 Hz and 150 Hz sideband signals from generators 17 and 18 respectively. The sideband signals from generators 17 and 18 are also applied to a mixer 19, which provides a sideband only (SBO) output signal. This SBO signal comprises 180° phase displayed 90 Hz and 150 Hz sidebands centered about a suppressed 330 MHz carrier frequency.

The SBO signal is appllied directly to the uppermost element 14 of the array and, via an amplitude doubling and phase inverting network 20, to the middle one 12 of the lower three elements of the array.

The output from the mixer alone, comprising the reference carrier equally modulated by phase locked 90 HZ and 150 HZ tones, i.e. the CSB signal is applied directly to the middle one 13 of the upper three array elements and is applied to the lowermost element 11 by way of an amplitude trebling and phase inverting network 21.

We claim:
1. An instrument landing system for providing lower susceptibility to above ground interference and comprising an antenna array having four substantially equi-spaced elements arrayed one above another above a ground plane, the lowermost element and the centre one of the upper three elements being arranged to be driven to radiate CSB energy alone, and the uppermost element and the centre one of the lower three elements being arranged to be driven to radiate SOB energy alone, the relative amplitudes and phases of the drive signals being to the lowermost element, CSB 3/180°,
to the centre of one of uppeer three elements, CSB 1/0°,
to the uppermost element, SBO 1/0°,
to the centre one of lower three elements, SBO 2/180°, the drive magnitudes being variable by ±15%, and by the phase angles being variable by +10°.

2. An instrument landing system as claimed in claim 1, wherein the lowermost element is spaced from the ground plane by a distance substantially equal to the spacing between the array elements.

* * * * *